July 21, 1953     C. G. GERHOLD     2,646,392
APPARATUS FOR FRACTIONATING MULTICOMPONENT STREAMS
Filed April 29, 1949                        2 Sheets-Sheet 1
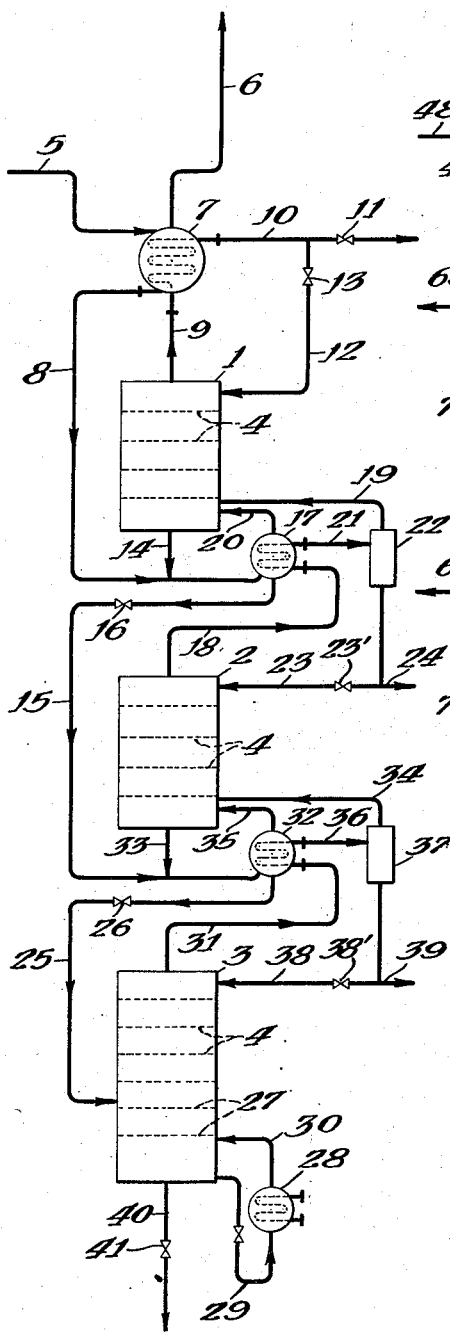
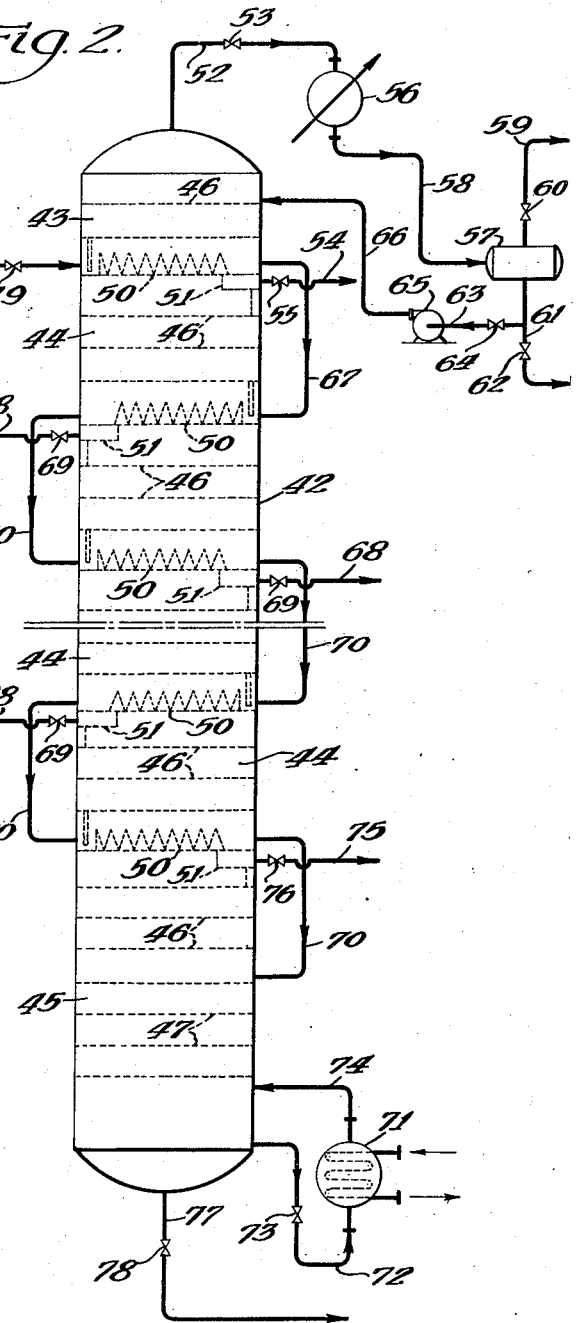
Inventor:
Clarence G. Gerhold
By: M. P. Venema
       Attorney
Philip J. Liggett
       Agent

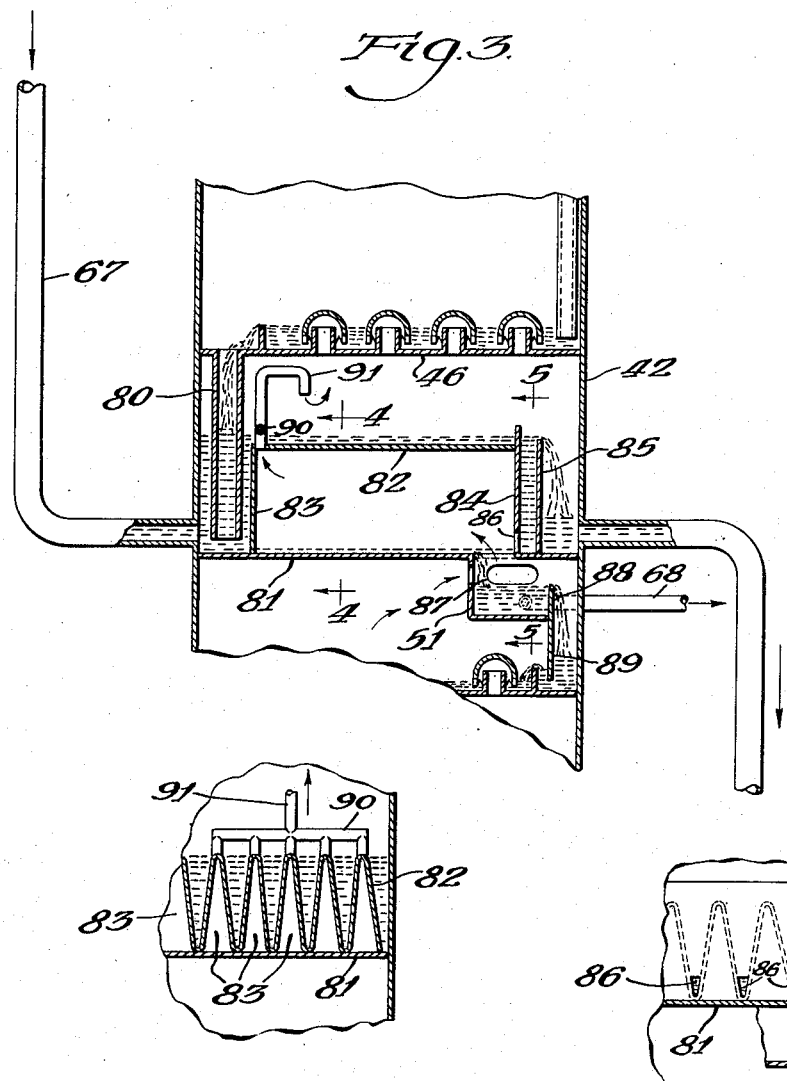

Patented July 21, 1953

2,646,392

UNITED STATES PATENT OFFICE 2,646,392

APPARATUS FOR FRACTIONATING MULTI-COMPONENT STREAMS

Clarence G. Gerhold, Riverside, Ill., assignor to Universal Oil Products Company, Chicago, Ill., a corporation of Delaware Application April 29, 1949, Serial No. 90,486

6 Claims. (Cl. 196—139)

This invention relates to an improved method and means for effecting the fractionation of multi-component streams, and more specifically, to an improved operation and arrangement which provides heat economy through the vaporization and condensation of a number of small portions of the stream and the removal of condensate at each of a plurality of separate fractionating zones.

Fractionating and distilling operations are commonly carried out in vertically disposed bubble towers or baffled contacting chambers, with the charge stream in each case being introduced into the tower at an intermediate point, and heat supplied by means of a reboiler or the like at the lower end of the tower, and the heat carried up through the tower by the rising vapor stream which in turn gives up heat to a descending liquid stream in a direct countercurrent contact. Various desired sidecuts or product streams may be withdrawn from the tower at different levels, in either a vapor or liquid phase. However, in a bubble tray type of operation and in a large fractionating column wherein there is multiple withdrawals of the products and sidecuts, the heat supplied must be sufficiently high to cause vaporization of all the products that are collected above the vaporizing and heating sections, and in general a somewhat greater amount of heat is required in order to vaporize a portion of the heavy bottom stock to provide a reflux stream. Without excess vaporization, there is little or no reflux on the plates just above the heating section and the fractionating operation is not as efficient as desirable, particularly in the lower portion of the column. In the operation of the present invention, a considerably smaller total input is required, with only that heat necessary to distil the desired higher boiling components of the charge stream being supplied to the last of the fractionating zones, and this heat being used repeatedly in a series of distillation steps, with the bottoms in each of the series of distilling and fractionating zones being supplied heat by indirect heat exchange with the vapors from the top of the succeeding zone.

It is a principal object of the present invention to provide an operation wherein the total heat requirement of the multiple distillation operation is small in comparison with a conventional type of fractionator, the same heat being repeatedly used for a number of separate distillation steps. In addition, and as a corollary to an operation providing an improved heat economy, the amount of cooling required in the recovery of desired product streams, is correspondingly reduced.

It is also an object of the present invention to provide an operation wherein vapor in each section of a series of sections of the unit is condensed and a portion of the condensate withdrawn therefrom, so that the vapor load in any one portion of the unit is much less than in a conventional column and with the result that a unitary column having a series of superimposed zones can be substantially reduced in diameter as compared to that of a conventional column.

It is a further object of the invention to provide through a series of indirect heat exchange operations the removal of low boiling fractions as separate cuts under conditions wherein the volatility of the higher boiling bottom fractions is relatively low, permitting greater ease of fractionation and a reduction in the reflux requirements.

It is a still further object of the present invention to provide an improved fractionating apparatus of a unitary construction, which maintains a series of superimposed fractionating zones with a heat exchange type of tray separating the zones and having a large heat transfer area between the liquid and vapor sides thereof, in order to accomplish both the reboiling of the liquid and the condensation of the vapor from the succeeding zone, and means for collecting and withdrawing at least a portion of the liquid condensed from the vapors in each of the zones.

Briefly, this improved method for fractionally distilling a multi-component mixture comprises the steps of, passing the charge stream of the mixture to the first of a series of fractionating zones and heating the stream by passing the latter in indirect heat exchange with vapors from the succeeding zone of the series, passing the resulting unvaporized liquid portion of the stream from the first zone to the second zone of the series and continuously passing remaining unvaporized portions successively through each of the series of zones, passing the unvaporized liquid portion in each zone in indirect heat exchange with vapors from the succeeding zone and thereby heating the liquid in each zone, simultaneously condensing vapors in each zone by said indirect heat exchange and withdrawing at least a portion of the condensed vapors from each of the zones, supplying heat to the last zone of the series in an amount necessary to vaporize and distil the more volatile components in the resulting unvaporized liquid being passed from the next to last zone, and withdrawing the heavier unvaporized portion of said mixture from the last zone.

In a preferred embodiment of the invention, the operation is effected in a unitary type of apparatus having a series of superimposed fractionating zones maintained within a vertically disposed column, such that unvaporized portions of liquid from each of the zones may be passed in a gravity flow from the lower portion thereof to the next lower and succeeding fractionating zone. Also, each of the zones may be provided with conventional bubble decks or the like to rectify the ascending vapor stream by countercurrent contact with the portion of the condensate which is not removed from each zone as net product. The heat exchange trays between zones is preferably constructed so that the liquid stream passes in countercurrent indirect heat exchange flow with the vapor stream of the next zone. In the last zone of the series, the liquid feed being introduced from the next to the last zone to the lower zone is passed thereto in such a manner that stripping may be accomplished below the feed point. The remaining liquids in the bottom of the column may be reboiled in the conventional manner, with unvaporized bottoms being removed, while the vapors produced therein are passed in indirect heat exchange contact with the preceding, or next higher fractionating zone, and substantially condensed and collected by means provided in the upper portion of the zone. Within each of the contacting or fractionating zones, a portion of the condensed product stream is withdrawn and a portion is allowed to descend as reflux to the bubble decks or contacting trays of that section.

A vapor stream may be withdrawn from the uppermost or first zone of the unit, and where desired a portion of the condensed vapor stream withdrawn therefrom may be returned as reflux in a conventional manner; however, this condensation and recovery step is not essential to the operation.

The improved operation of this invention is particularly useful in connection with the separation of hydrocarbons, such as the distillation of crude oil, or the rerunning of gasoline, where wide boiling and highly complex mixtures are distilled, however, the operation should be in general limited to those in which the amount of unvaporized bottoms is relatively small. The indirect heat exchange between each of the contacting sections accomplishes a dual purpose of heating and vaporizing liquid in one zone while condensing vapors in the succeeding or lower zone, thus, there may be removed from the total feed a number of relatively small portions of vapor. At least a portion of the condensed vapor in each zone is withdrawn from the upper portion thereof as a product stream, while the remaining portion flows downwardly as reflux in each of the fractionating sections.

It is not intended to limit the present invention to any one particular type of fractionating unit or column; however, as noted hereinabove, a preferably embodiment of the invention comprises a single vertically disposed unitary apparatus. Briefly, the apparatus comprises in combination a series of superimposed fractionating sections, each section having a plurality of liquid-vapor contacting decks and a lower heat exchange tray, with each of the latter forming partitioning means suitable for channeling residual liquid within each section in indirect heat exchange with vapors from the next lower section, condensate collecting means below each of the partitioning means within the upper portion of each section, and a condensate outlet from each of the collecting means permitting the withdrawal of at least a portion of liquid from each section and the return of a portion of liquid to each as reflux, passageway or conduit suitable for passing unvaporized liquid to the next succeeding section, fluid inlet means to the top section of the column, fluid outlet means from the lower end of the column, and fluid heating means connecting with the lower section of said column.

A preferred embodiment of the unitary apparatus maintains the series of superimposed fractionating and distilling sections within a single vertically disposed shell or housing so that the liquid portion which remains unvaporized, may be passed downwardly to the next succeeding section in a gravity flow through conduit means which may be within or without the housing. The vertical arrangement also permits the liquid phase to flow across the bottom of each section in indirect heat exchange with the vapors from each of the succeeding sections. Vapors normally rise to the upper portion of each section and the indirect heat exchange may be readily accomplished by a suitable partitioning and heat exchange type of tray between each of the sections. Various forms of heat exchange and partitioning trays may be devised between each contacting section; however, the construction is preferably such that the liquid is free to flow across the deck or tray from one side of the column to the other countercurrent to vapor flow, and a substantially large heat transferring surface or area is provided between the liquid and vapor sides or faces of the partitioning member, in order to provide an efficient transfer of heat therebetween. Also, various types and forms of collecting trays or wells may be provided below or in conjunction with the heat exchange surface of the tray for collecting and receiving condensate from the vapors, however, in each case, outlet means is provided from each collecting well to withdraw at least a portion of the condensate, while downspout or other liquid-trap or vapor sealing means is usually provided to pass a portion of the condensate downwardly through the section as reflux therein.

A preferable form of the heat exchange tray, is one which embodies corrugations or other deformations, which in turn provide a channeling of the liquid stream across the top thereof from one side of the column to the other, while at the same time providing a large heat transfer surface, and a series of adjacent or parallel corrugations in the partitioning member provides a very convenient form of construction to accomplish the desired purpose. A weir or other baffling means at the end of the corrugations or other deformed heat transferring plates is desirable to insure a liquid level over the entire surface of the heat transfer member in order to accomplish efficient heat exchange between the vapor and liquid phases. A preferred embodiment of the apparatus also provides vents at the top of the heat transfer partition and vapor channels in order to insure a countercurrent flow of vapor with respect to the liquid thereabove and to allow any vapor which is uncondensible at the temperature conditions occurring in that part of the column to pass upwardly into the next zone, while at the same time permitting an equalization of pressure between zones. The vapor vents should, however, be suitably baffled or trapped in order to prevent liquid from the section above passing downwardly therethrough and contaminating the condensate obtained within the lower section.

The present improved fractionating and distilling operation, where the indirect heat exchange is utilized and there is removed from the total feed a number of relatively small portions of condensate, is of particular advantage over conventional methods of fractionation and distillation by reason of its thermal efficiency. The same heat which is introduced to the lower portion of the unit is utilized repeatedly for a number of the separate distillation steps, the heat being introduced at the lower end of the column, or at the last of the series of sections, being that required to vaporize and distil the desired lighter component of the unvaporized stream introduced into that section, and this heat is, in general, a small fraction of the heat requirement necessary in a conventional type of fractionating column. Similarly, or in conjunction therewith as a result of the heat economy, a corollary to the operation, in that the amount of cooling required for the condensate, or withdrawal products stream, is correspondingly reduced. In other words, product streams are condensed and withdrawn in a liquid phase from each of the sections of the column, rather than in the vapor phase which necessarily requires a cooler, a condenser and suitable receiving apparatus.

It is also an advantage of the present operation, having the unit divided into a series of substantially separated fractionating and distilling sections, that the vapor load in any one section of the column is considerably less than in a conventional column, while at the same time, a substantially lesser quantity of reflux is required in the various independent and separated stages as compared to a continuous column, with the result that the column diameter may be substantially reduced with respect to that of a conventional column having ordinary type of bubble trays therein.

The improved operation, as well as additional advantages and benefits obtained by the process and apparatus of this invention, will be more apparent upon reference to the accompanying drawing and the following description thereof.

Figure 1 of the drawing shows diagrammatically a series of fractionating and distilling zones and indirect heat exchange means suitable to carry out the improved operation of this invention.

Figure 2 of the drawing illustrates diagrammatically a preferred operating flow and unitary embodiment of apparatus suitable to carry out this improved method of fractionating and distilling a multi-component stream, with the indirect heat exchange indicated as being accomplished within a single vertical chamber.

Figure 3 of the drawing indicates in an elevational cross-section view, one form of heat exchange tray and partitioning means between superimposed fractionating sections in a single vertically disposed column.

Figure 4 is a sectional view through a portion of the heat exchange tray, as indicated by the line 4—4 in Figure 3 of the drawing.

Figure 5 is also a sectional view through the tray, as indicated by the line 5—5 in Figure 3 of the drawing.

Referring now to Figure 1 of the drawing, there is indicated a series of separated fractionating and distilling zones 1, 2 and 3, each having a plurality of bubble trays, perforated plates, or other suitable rectifying decks 4. A mixed charge stream, such as a hydrocarbon distillate stream, having components which are desired as separate product streams, is charged by way of line 5 to a heat exchange zone 7. The stream passes in indirect heat exchange with vapors from the top of the fractionating section 1 and a resulting unvaporized portion subsequently passes by way of line 8 to the lower portion of a second heat exchange zone. Normally the vaporization of at least a portion of the charge stream takes place in the heat exchanger 7 and resulting vapors are discharged therefrom through line 6, however, the first heat exchange may be effected so that no vaporization takes place in 7 with the heat being absorbed as sensible heat in the liquid charge. The vapors from section 1 are passed upwardly through line 9 to the heat exchanger 7, where as hereinbefore noted, they pass in indirect heat exchange with the incoming charge stream entering through line 5. At least a portion of the vapor is condensed within the heat exchange zone 7 and is withdrawn as condensate through line 10, having control valve 11. A portion of the condensate is returned to the fractionating zone 1 by way of line 12 having valve 13, and serves as reflux for the countercurrent rectification being effected in the various superimposed bubble trays 4, within zone 1. The unvaporized liquid from section 1 passes downwardly therefrom through line 14 to line 8 and next heat exchange zone 17.

As in the first heat exchange zone 7, the liquid portion from section 1 and heat exchanger 7 pass in indirect heat exchange with vapors from the next lower section 2. Resulting vapors from section 2 passing upwardly through line 18 to heat exchanger 17. In other words, the exchanger 17 serves as a reboiler for the lower portion of the first fractionating and distillation zone 1. The vaporized liquid is passed to the fractionating zone 1 by way of line 20, and liquid which remains unvaporized is passed from exchanger 17 by way of line 15, having valve 16 to the next succeeding heat exchanger zone 32. The vaporous stream passing to exchanger 17 by way of line 18 is withdrawn substantially as condensate through the line 21 and passed to a collecting zone or receiver 22. At least a portion of the resulting condensate is withdrawn from the system through line 24 as product, while the remaining portion is used as reflux and is passed by way of line 23 and valve 23' to the upper portion of the next succeeding fractionating section 2. Uncondensed vapor is passed from the receiver 22 through line 19 to the fractionating zone 1.

Also, as in section 1, a rectification operation is effected within section 2, such that a substantially pure and desired product stream is provided for condensation and withdrawal from the exchanger 17, by way of the line 24.

In this diagrammatic embodiment, fractionating section 3 is the last of the series, and the unvaporized portion from the preceding section is passed to an intermediate point just above suitable stripping trays 27, and the resulting unvaporized portion of the charge stream passes to the lower portion of that section. The total heat input to the system is introduced in the last section of the series, in this case, section 3, and as illustrated by this embodiment, a conventional reboiler 28 is connected with the section 3 by lines 29 and 30, which are suitable to circulate the bottoms through the exchanger 28 and heat this unvaporized portion as may be necessary to provide vaporization of the desired lighter or more volatile components which are contained in the liquid stream being charged to this last section. Resulting vapors passed upwardly through section 3 and the stripping and rectification trays therein to the top of the section, from which they pass by way of line 31 to the heat exchanging apparatus 32. As with the preceding zones, the unvaporized liquid proportion of section 2 passes in indirect heat exchange with the vapors of section 3, within the heat exchange apparatus 32.

The liquid stream passing by way of line 15 to the exchanger 32 is heated and resulting vapor passed by way of line 35 to the lower portion of section 2, while unvaporized material is subsequently passed from exchanger 32 through line 25 and valve 26 to section 3. The vaporous product entering exchanger 32 from the section 3 by way of line 31 is substantially condensed and is passed by way of the line 36 to a receiver 37. A portion of the condensate is withdrawn as a product stream through line 39 and the remainder passed as reflux to the lower fractionating section 3 by way of line 38 having valve 38'. Uncondensed vapor is passed from the receiver 37 through line 34 to the lower portion of zone 2. Liquid which is still unvaporized within the heat exchanger 32 is passed therefrom by way of the transfer line 25 and control valve 26, and as hereinbefore noted and described, this stream is passed in this embodiment to an intermediate point in zone 3, about the stripping decks 27. Unvaporized bottoms from zone 3 withdrawn from the lower portion thereof by means of an outlet line 40, having valve 41. The heating medium supplied to exchanger or reboiler 28 may be high temperature steam or other suitable heating medium which may be furnished at a temperature and in a quantity necessary to supply the heat requirements of the fractionating system of this invention. The heat requirements will of course vary in accordance with the type of fractionating and distillation operation which is being effected in the unit. In each zone of the series, a suitable number of decks or rectifying trays 4 are utilized to effect the production of a substantially pure or desired product stream as condensate from each of the heat exchange sections between the series of zones. In a suitably balanced design, the vaporous stream from the last of the sections, in this instance section 3, provides the heat for vaporizing the liquid passed to the next preceding section 2, and provides heat for the vaporization or rectification of a desired product stream, which is withdrawn ultimately as condensate through line 24. While this diagrammatic sketch indicates only three distilling and fractionating zones, it is, of course, not intended to limit the fractionation operation to any set number of zones, nor is it intended to limit the use of the net heat in only 3 heat exchanger zones, for obviously, it may be utilized repeatedly in a multiplicity of zones and for the separation of a multi-component stream having more than three desired components. It may be further noted, however, that where the liquid condensate withdrawn from each of the zones is not a desired product, it may be combined with other cuts or streams as may be convenient.

Referring now to Figure 2 of the drawing, there is indicated a preferred embodiment of the system, utilizing a single vertically disposed column or chamber 42 and having therein a plurality of superimposed fractionating and distilling sections, each of which is separated by a suitable heat exchange deck or tray that is built internally within the column. An upper contacting section 43 is provided in top of the tower 42, while therebelow is a series of intermediate zones 44, and a lower zone 45, which is the last of the series. Each of the superimposed distillation and fractionating sections has a plurality of spaced bubble decks or other suitable rectifying trays 46, while the lower section 45 also has a plurality of stripping trays 47 which are placed below the feed point to that zone.

The mixed or multi-component charge stream is introduced to the lower portion of the upper section 43, through the line 48 and control valve 49 and in accordance with the preferred embodiment of the present invention, the liquid stream passes across the tower in contact with a specially designed heat exchange tray that provides indirect heat exchange with vapors produced in the next lower section, in a manner hereinafter described.

The plurality of heat exchange trays 50 are indicated diagrammatically in Figure 2 of the drawing, with one being placed between each of the superimposed sections to form partitioning means, as well as a heat exchange surface between the liquid and vapor phases. Each of the heat exchange trays 50 also has in conjunction therewith a suitable well or condensate collecting means 51, from which at least a portion of the condensate obtained is discharged from the column while a portion is returned to the trays 46 in the section therebelow as reflux for counter-current contact with the rising vapor stream therein.

In operation, the multi-component charge stream passes across the upper heat exchange tray 50, between the first and second fractionating zones of the series, and is heated by vapors which are in indirect heat exchange with the liquid stream, the vapors being those from the succeeding distilling and fractionating section 44. Resulting vaporized components from the top section 43 may be passed from the column by way of line 52, having control valve 53 while the vapors condensed below the heat exchange surface are collected within the well 51, and at least a portion thereof is withdrawn from the column by way of line 54 having control valve 55. A remaining or suitable portion of the condensate is allowed to descend from the well 51 back into the fractionating section therebelow and provide reflux for the rectification operation being carried out therein.

Where the vapor from the upper and first zone of the series is desired as a product stream, the vapors from line 52 may pass through a cooler 56 and from the latter by way of line 58 to a suitable receiver 57. Uncondensed vapors are discharged from receiver 57 through line 59 having control valve 60 and the desired condensed product stream is withdrawn by way of line 61, having valve 62. As may be necessary, a portion of the condensate stream may be recycled to the upper portion of the top fractionating section 43 for use as reflux. This reflux stream may be withdrawn by way of line 63, having valve 64, and passed through pump 65 and line 66 to the top deck of the section. It is again pointed out, however, that the heating of the liquid charge in the first or upper zone of the series need not be such as to effect a net overhead vapor stream, for the heat supplied by the heat exchange may be absorbed as sensible heat.

The unvaporized portion of the charge stream, after passing across the upper tray 50, is withdrawn from the first fractionating zone of the series by way of a downpipe or conduit 67. The transfer line 67 connects with the next lower zone 44 at a point just above the next lower heat transfer tray 50, so that the liquid may pass across this heat exchange tray in indirect heating exchange relationship with the vapors from the next lower or successive zone. The stream passing through line 67 to the next lower heat transfer tray 50 should of course enter the column through a suitable liquid trap in order that vapors do not pass upwardly through the liquid transfer line to the next upper section.

In each of the successive intermediate and indirect heat exchange contacts between the liquid and vapor phases of adjacent zones, the vapors from the next lower or succeeding zone serve to heat and reboil and vaporize the liquid stream in the preceding section, while at the same time, the liquid stream serves to cool and condense a substantial portion of the vapors and provide a condensate which is collected within the various wells 51 of each of the heat transfer trays. The indirect heat exchange operation is carried out between each of the successive zones, and the number of zones provided depends upon the characteristics of the components being fractionated.

At least a portion of the condensate recovered at each of the intermediate zones 44 is withdrawn from each of the wells 51 by means of a suitable outlet line 68 having control valve 69. Also, the unvaporized portion of the charge stream which remains after the heat exchange contact in each section, is passed by way of a suitable conduit or transfer line 70 to the next lower section. The amount of unvaporized liquid of course decreases from one zone to another, by reason of product streams being withdrawn as condensate at each of the distilling and fractionating sections. It should also be noted, that to effect an efficient operation in accordance with the present invention, this heat conserving operation is primarily adaptable to wide boiling and highly complex mixtures wherein the amount of unvaporized bottoms will be relatively small.

In the last of the fractionating zones, section 45, the unvaporized liquid stream entering zone 45 from the next to last zone is introduced intermediately and above a series of stripping decks 47. This arrangement permits a stripping operation with unvaporized bottoms undergoing a reboiling in a suitable heat exchanger or reboiler 71. The latter is connected to the lower portion of the chamber by means of a withdrawal line 72 having valve 73, and a return line 74. As has been noted hereinabove and in connection with Figure 1 of the drawing, the heat supplied to the system is substantially less than in a conventional fractionating column wherein heat is supplied to maintain vaporization of all of the products that are collected above the vaporizing and heating sections, and generally in addition to this, sufficient heat to vaporize at least a portion of the heavy bottoms stock to provide suitable reflux in the entire length of the column. In the present operation, the heat supplied to the lower, or last section of the unit, is only that necessary to volatilize and fractionate or distil the component remaining in the unvaporized charge stream which is desired as a product stream from the well 51 between the last and next to last zones. A suitable number of rectifying decks 46 are maintained in the last section in conjunction with the suitable heating and reflux conditions to maintain a desired product which may be withdrawn by way of line 75 and control valve 76. The unvaporized portion of the charge stream, which remains as bottoms in the lower of the zones, may be withdrawn by way of line 77, having valve 78.

The flow in the fractionating and distilling operation effected within the embodiment of Figure 2 of the drawing is equivalent to that carried out in Figure 1 of the drawing; however, it may be noted that the embodiment of Figure 2 provides a distinct advantage over the other in that each of the independent transfer heat exchangers is replaced by a single heat transfer surface which is maintained within a single column. The heat exchange surface of the tray between each of the superimposed sections being used to accomplish both the reboiling of the liquid and the condensation of the vapor, and the vapor generated in each of the sections utilized by heat and vaporized liquid in the next preceding section.

While it is not intended to limit the construction of the heat exchange tray, indicated diagrammatically as 50 in Figure 2 of the drawing, one embodiment thereof is shown diagrammatically and in greater detail within Figure 3 of the drawing. Referring now to Figures 3, 4 and 5 of the drawing, there is shown in sectional elevational views a portion of the vertically disposed unitary column 42, having a bubble tray 46 such as may be used in each of the contacting sections and a heat exchange tray as used between zones. A conduit 67 is indicated as supplying liquid from a superimposed and next preceding fractionating section, while a downspout 80 provides means for passing unvaporized liquid from the lower deck 46 to the bottom of the section, at a point within a liquid trap and above a solid non-perforate tray 81.

Tray 81 has positioned thereon a suitable corrugated partition and heat exchange member 82, that in this embodiment provides the desired large surface area between the upper liquid phase and the lower vapor phase of the next lower or succeeding fractionating zone. It is not intended to limit this invention to utilizing a corrugated form of partitioning plate 82, however, a plurality of deep parallel corrugations, such as indicated in cross section within Figure 4 of the drawing, does provide a desirable large area or surface for indirect heat exchange purposes. The parallel corrugations also provide means for channeling the liquid stream across the tower from one side to the other such that a controlled flow is maintained in the column, with the liquid phase being maintained in heat exchange and a countercurrent flow relationship with vapors which are passing upwardly to the top of each of the substantially confined fractionating sections and in this case to the under side of the corrugated member 82. Preferably, the plate 81 and the partition 82 thereabove have a slight slope across the tower to insure a flow of the liquid to the outlet ends.

In the present embodiment, a plate 83 closes off the ends of the open lower corrugated channels or sections and forms a vapor zone on the under side of the plurality of corrugations, while liquid entering the tray must flow to the downstream end of the plurality of parallel corrugations over the plate 82. A closure and partitioning plate 84, is provided to seal off the vapor channels at the other end of the corrugations. However, as may be noted with reference to Figures 3 and 5 of the drawing, the plate 84 also extends across the upper portion of the liquid channels, leaving openings 86 at the lower portions thereof, so that the liquid stream is baffled downward and then upwardly over a vertically disposed weir 85. The unvaporized liquid passing over weir 85 is discharged from that zone to the next lower by way of conduit 70. Figure 5 of the drawing shows an elevational view of the openings or perforations 86 within the plate 84, and at the bottom of the liquid channels.

The cooled vapor stream which condenses within the vapor section, is allowed to flow over plate 81 to a suitable condensate collecting trough 51. The vapors pass from the lower fractionating zone to the lower side of the corrugated member 82 by means of a suitable opening or opening 87 within the wall portion of the well 51. The condensate collecting trough or well 51 is also attached to the horizontal plate 81 in a manner permitting vapor to channel to the underside of the corrugations and vapor space as provided by the heat exchange member 82.

In a preferable operation, the vapor stream is substantially condensed in the heat exchange zone of the unit and the resultant condensate is collected on the tray 81 to in turn be passed to the trough or well 51 for removal from the column by way of outlet line 68, as well as to the decks of the section therebelow as reflux. The condensate withdrawal zone is provided with a suitable weir 88 and a downspout or downpipe section 89, so that condensate may be withdrawn from a liquid pool on well 51, the overflow providing reflux to the rectification section in the zone below.

It is also a feature of the present internal heat transfer tray, as indicated in the drawing, to provide vents at the top of the heat transfer vapor channels to permit any vapor which is uncondensable at the temperature conditions occurring in that part of the column to pass upwardly into the next zone, and to equalize pressure between zones. In this embodiment, one or more headers 90 connects with each of the vapor channels and an outlet vent line 91 in turn connects with the header 90. The vent line 91 is constructed to turn downwardly in order to prevent liquid from the tray or from the upper bubble trays passing inwardly in any manner.

While the drawing in the foregoing description describes the operation of one embodiment and construction of a unitary fractionating apparatus suitable for this invention, it is of course not intended to limit the construction arrangement to this one embodiment only. As has hereinbefore been noted, other shapes and forms of the heat transferring member 82 may well be used to provide a large heat transferring surface between the liquid and vapor sides of the column; however, deep parallel corrugations as indicated in the drawing does provide a desirable form which channels the liquids across the tower from one side to the other in heat exchange relationship with the vapor stream passing thereunder. Other types of wells or collecting trough for the condensate may be provided in conjunction with the heat transfer zone, as well as a different form of vapor opening and path for the vapors to ascend into the heat transferring area. The construction, however, should be such that at least a portion of the condensate can be removed from the column at each zone of heat transfer and the remainder of the condensate allowed to pass downwardly as reflux in each of the contacting sections.

While the transfer conduits 67 and 70 have been indicated as being external of the column, it is of course possible to provide internal piping or conduits which are suitable for transferring the unvaporized liquid portion from each section to the lower portion of the next succeeding section. Also, the transfer may be made to a lower bubble tray of a section rather than to the heat exchange tray, where some stripping of the liquid stream is desirable, or where a sidecut stream is desired from the lower end of one of the sections.

I claim as my invention:

1. In a fractionating column, the combination of a bubble tray and a partition therebelow extending across the column, a heat exchange tray on said partition and spaced from the walls of the column, thereby providing a liquid well at each end of the heat exchange tray, a downspout depending from said bubble tray into one of said wells, said heat exchange tray being constructed and arranged to form with said partition a plurality of alternating liquid and vapor channels, means for passing liquid from the last-mentioned well through said liquid channels to the other of said wells, means for removing liquid from said other well and from the column, a condensate collecting trough depending from said partition and a condensate outlet therefrom, and a vapor passageway through said trough communicating with said vapor channels.

2. In a fractionating column, the combination of a bubble tray and a partition therebelow extending across the column, a heat exchange member supported on and forming with said partition a plurality of alternating liquid and vapor channels disposed between said tray and the partition, means for supplying liquid from the bubble tray to one end of said liquid channels to flow through the latter in a plurality of parallel streams, a condensate collecting trough depending from said partition and a condensate outlet therefrom, and a vapor passageway through said trough communicating with said vapor channels for passing parallel streams of vapors through the latter in indirect heat exchange relation with the liquid streams in said liquid channels.

3. In a fractionating column, the combination of a partition extending across the column, a heat exchange member supported on and forming with said partition a plurality of alternating liquid and vapor channels, means for supplying liquid to said liquid channels to flow therethrough in parallel streams, means for maintaining a substantial depth of liquid in each of the liquid channels and for discharging liquid therefrom, a condensate collecting trough depending from said partition and a condensate outlet therefrom, and a vapor passageway through said trough communicating with said vapor channels for passing parallel streams of vapors through the latter in indirect heat exchange relation with the liquid streams in said liquid channels.

4. A heat exchange tray for a vertically disposed fractionating column comprising corrugated partitioning means providing an extended substantially large area heat exchange surface, means for passing liquid and vapors over opposite sides of said partitioning means in indirect heat exchange, a weir at one end of the partitioning means for maintaining a body of liquid over the full depth of said partitioning means, a condensate collecting trough below said partitioning means and a condensate outlet therefrom, a vapor passageway through said condensate collecting trough to the lower side of said corrugated partitioning means, and a vapor vent extending upwardly from said partitioning means.

5. The apparatus of claim 4 further characterized in that said partitioning means has a plurality of parallel and substantially deep corrugations providing thereby a plurality of parallel liquid channels on the upper portion thereof in heat exchange relationship with a plurality of parallel vapor channels on the under side thereof, transverse partitioning means at the ends of said corrugations maintaining vapor channels below said means and separate from liquid channels on the upper surface, said venting means connects with the upper ridges and each of the corrugations of said partitioning means whereby to provide vapor venting from each of the parallel vapor channels, an overflow weir connects with said condensate collecting trough and maintains a liquid pool therein, said condensate outlet connects with said pool, and a reflux downspout means extends downwardly from said collecting trough.

6. The apparatus of claim 5 still further characterized in that the vapor inlet to the vapor channels below said partitioning means is at the liquid outlet end of the heat exchange tray and said venting means extends therethrough at the liquid inlet end of the channels above said partitioning means, whereby the vapor flows countercurrently in heat exchange relationship with the liquid above the partitioning means.

CLARENCE G. GERHOLD.

References Cited in the file of this patent

UNITED STATES PATENTS

| Number | Name | Date |
|---|---|---|
| 1,662,105 | Doherty | Mar. 13, 1928 |
| 1,672,978 | Fisher | June 12, 1928 |
| 1,713,254 | Brandt | May 14, 1929 |
| 1,713,255 | Brandt | May 14, 1929 |
| 1,820,573 | Lyons | Aug. 25, 1931 |
| 1,873,135 | Laird | Aug. 23, 1932 |
| 1,898,245 | Doherty | Feb. 21, 1933 |
| 1,939,392 | Gray et al. | Dec. 12, 1933 |
| 2,005,316 | Hall | June 18, 1935 |
| 2,221,702 | Eaton | Nov. 12, 1940 |
| 2,334,667 | Zavertnik | Nov. 16, 1943 |
| 2,471,134 | Wright | May 24, 1949 |